United States Patent
Chung et al.

(10) Patent No.: US 9,768,448 B2
(45) Date of Patent: Sep. 19, 2017

(54) BINDER COMPOSITION FOR RECHARGEABLE LITHIUM BATTERY, METHOD OF PREPARING SAME, ELECTRODE FOR RECHARGEABLE LITHIUM BATTERY AND RECHARGEABLE LITHIUM BATTERY INCLUDING SAME

(71) Applicants: SAMSUNG SDI CO., LTD., Yongin-si, Gyeonggi-do (KR); AEKYUNG CHEMICAL CO., LTD., Seoul (KR)

(72) Inventors: Byung-Joo Chung, Yongin-si (KR); Yeon-Hee Yoon, Yongin-si (KR); Nam-Seon Kim, Yuseong-gu (KR); Kwang-Sik Choi, Yuseong-gu (KR); Soo-Jung Kim, Yuseong-gu (KR)

(73) Assignees: Samsung SDI Co., Ltd., Yongin-si (KR); Aekyung Chemical Co., Ltd., Seoul (KR)

( * ) Notice: Subject to any disclaimer, the term of this patent is extended or adjusted under 35 U.S.C. 154(b) by 96 days.

(21) Appl. No.: 14/807,834

(22) Filed: Jul. 23, 2015

(65) Prior Publication Data

US 2016/0036056 A1    Feb. 4, 2016

(30) Foreign Application Priority Data

Aug. 1, 2014  (KR) .......................... 10-2014-0099233

(51) Int. Cl.
| | |
|---|---|
| *H01M 4/62* | (2006.01) |
| *H01M 4/88* | (2006.01) |
| *H01M 4/133* | (2010.01) |
| *H01M 4/134* | (2010.01) |
| *H01M 4/38* | (2006.01) |
| *H01M 4/587* | (2010.01) |
| *H01M 4/505* | (2010.01) |
| *H01M 4/525* | (2010.01) |
| *H01M 10/0525* | (2010.01) |

(52) U.S. Cl.
CPC .......... *H01M 4/622* (2013.01); *H01M 4/133* (2013.01); *H01M 4/134* (2013.01); *H01M 4/386* (2013.01); *H01M 4/505* (2013.01); *H01M 4/525* (2013.01); *H01M 4/587* (2013.01); *H01M 10/0525* (2013.01)

(58) Field of Classification Search
CPC .... H01M 4/0525; H01M 4/133; H01M 4/134; H01M 4/386; H01M 4/505; H01M 4/525; H01M 4/587; H01M 4/622; H01M 10/0525
See application file for complete search history.

(56) References Cited

U.S. PATENT DOCUMENTS

| | | | |
|---|---|---|---|
| 6,271,278 B1* | 8/2001 | Park ........................ | A61L 15/60 521/102 |
| 7,875,388 B2 | 1/2011 | Le | |
| 2003/0232895 A1* | 12/2003 | Omidian .............. | A61K 9/0065 521/99 |
| 2005/0003272 A1 | 1/2005 | Jiang et al. | |
| 2005/0158624 A1 | 7/2005 | Park et al. | |
| 2007/0068816 A1* | 3/2007 | Solomon ................... | C08F 2/04 204/606 |

(Continued)

FOREIGN PATENT DOCUMENTS

| | | |
|---|---|---|
| JP | 2007-226969 A | 9/2007 |
| JP | 4617886 B2 | 11/2010 |

(Continued)

OTHER PUBLICATIONS

Material Safety Data Sheet Protanal L 20/40 Alginate, FMC Corporation, 2013.*
Machine English Translation for JP 2007-226969 A, published Sep. 6, 2007, 25 pages.
Machine English Translation for JP 4617886 B2, published Jul. 27, 2006, laid-open No. JP 2006-196205, 10 pages.

(Continued)

*Primary Examiner* — Anca Eoff
(74) *Attorney, Agent, or Firm* — Lewis Roca Rothgerber Christie LLP (57) ABSTRACT

A binder composition for a rechargeable lithium battery includes: an interpenetrating polymer network (IPN) structure including a cyclic polymer including a structural unit represented by Chemical Formula 1 or a structural unit represented by Chemical Formula 2, and polyacrylamide. A method of preparing the same, and an electrode for a rechargeable lithium battery and a rechargeable lithium battery including the same are also disclosed.

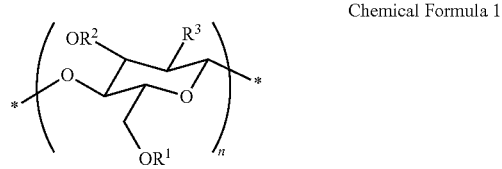

Chemical Formula 1

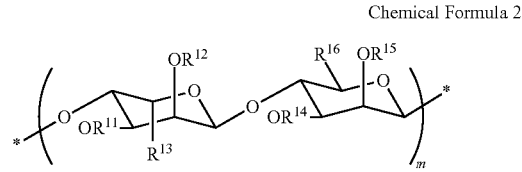

Chemical Formula 2

In Chemical Formulae 1 and 2, $R^1$ to $R^3$, $R^{11}$ to $R^{16}$, and n and m are the same as defined in the detailed description.

17 Claims, 3 Drawing Sheets

(56) References Cited

U.S. PATENT DOCUMENTS

2012/0088155 A1 4/2012 Yushin et al.
2014/0120423 A1 5/2014 Matsuo et al.

FOREIGN PATENT DOCUMENTS

KR 10-2014-0015589 A 2/2014
WO WO 2013/103956 A1 7/2013

OTHER PUBLICATIONS

EPO Search Report dated Dec. 17, 2015, for corresponding European Patent application 15178510.2, (7 pages).

* cited by examiner

BINDER COMPOSITION FOR RECHARGEABLE LITHIUM BATTERY, METHOD OF PREPARING SAME, ELECTRODE FOR RECHARGEABLE LITHIUM BATTERY AND RECHARGEABLE LITHIUM BATTERY INCLUDING SAME

CROSS-REFERENCE TO RELATED APPLICATION

This application claims priority to and the benefit of Korean Patent Application No. 10-2014-0099233, filed in the Korean Intellectual Property Office on Aug. 1, 2014, the entire content of which is incorporated herein by reference.

BACKGROUND

1. Field

Embodiments of a binder composition for a rechargeable lithium battery, a method of preparing the same, and an electrode for a rechargeable lithium battery and a rechargeable lithium battery including the same are disclosed.

2. Description of the Related Art

A rechargeable lithium battery includes positive and negative electrodes including a material that can reversibly intercalate/deintercalate lithium ions as positive and negative active materials, respectively; and an organic electrolyte solution or a polymer electrolyte solution provided between the positive and negative electrodes. Herein, the positive and negative electrodes intercalate and deintercalate lithium ions and produce electrical energy through oxidation and reduction reactions.

As for a positive active material for a lithium rechargeable battery, a lithium-transition metal oxide capable of intercalating lithium, such as $LiCoO_2$, $LiMn_2O_4$, $LiNi_{1-x}Co_xO_2$ (0<x<1), and the like, has been used.

As for a negative active material for a lithium rechargeable battery, various suitable carbon-based materials, such as artificial graphite, natural graphite, and hard carbon capable of intercalating and deintercalating lithium ions, have been used. Achieving a battery having high energy density may call for a negative active material having high theoretical capacity density. Accordingly, Si, Sn, and Ge alloyed with lithium and an oxide thereof and an alloy thereof have drawn attention.

For example, a Si-based negative active material has very high charge capacity and is widely applied to a high-capacity battery. However, the Si-based negative active material may expand by about 300% to about 400% during a charge and discharge cycle, and thus charge and discharge characteristics and cycle-life characteristics of batteries including a Si-based negative active material may be deteriorated.

Accordingly, a binder capable of effectively controlling expansion of the Si-based negative active material has been actively researched. For example, developments for a binder composition capable of effectively controlling expansion of the active material have been actively researched.

SUMMARY

One aspect of an embodiment is directed toward a binder composition for a rechargeable lithium battery that controls volume expansion of an active material effectively, has improved adherence, and/or has stability with respect to an electrolyte.

An aspect of another embodiment is directed toward an electrode for a rechargeable lithium battery including the binder composition.

An aspect of yet another embodiment is directed toward a rechargeable lithium battery having excellent initial efficiency, cycle-life characteristic and/or battery stability by including the binder composition.

An aspect of still another embodiment is directed toward a method of preparing the binder composition for a rechargeable lithium battery.

According to one embodiment, a binder composition for a rechargeable lithium battery includes an interpenetrating polymer network (IPN) structure including a cyclic polymer including a structural unit represented by Chemical Formula 1 or a structural unit represented by Chemical Formula 2, and polyacrylamide.

Chemical Formula 1

Chemical Formula 2

In Chemical Formulae 1 and 2, $R^1$, $R^2$, $R^{11}$, $R^{12}$, $R^{14}$ and $R^{15}$ are the same or different and are independently selected from hydrogen, a substituted or unsubstituted C1 to C5 alkyl group, or $-(CH_2)_p-COOX^1$, p being an integer of 1 to 5, and $X^1$ being an alkali metal,

$R^3$, $R^{13}$ and $R^{16}$ are the same or different and are independently $-OR^4$, $-NHR^5$ or $-COOX^2$, $X^2$ is an alkali metal, $R^4$ is hydrogen, a substituted or unsubstituted C1 to C5 alkyl group, or $-(CH_2)_p-COOX^1$, p being an integer of 1 to 5, and $X^1$ being an alkali metal, and $R^5$ is hydrogen or $-COCH_3$, and n and m are integers of 5 to 20,000.

The cyclic polymer may include one of structural units represented by Chemical Formulae 3-1 to 3-6.

Chemical Formula 3-1

Chemical Formula 3-2

-continued

Chemical Formula 3-3

Chemical Formula 3-4

Chemical Formula 3-5

Chemical Formula 3-6

In Chemical Formulae 3-1 to 3-6, $n^1$ to $n^5$ and $m^1$ are integers of 5 to 20,000.

The cyclic polymer may have a weight average molecular weight of about 2,000 g/mol to about 2,000,000 g/mol.

The polyacrylamide may have a weight average molecular weight of about 5,000 g/mol to about 1,000,000 g/mol.

A mole ratio of the cyclic polymer to the polyacrylamide may be about 1:9 to about 9:1.

The binder composition may further include an alkali metal ion. The alkali metal ion may be included in the binder composition in an amount of about 1 part by mole to about 10 parts by mole based on 100 parts by mole of the interpenetrating polymer network (IPN) structure.

The binder composition may further include an alkali metal ion and a phosphorus (P)-based compound. The alkali metal ion and the phosphorus-based compound may be adsorbed on the interpenetrating polymer network (IPN) structure. The phosphorus-based compound may be included in the binder composition in an amount of about 1 part by mole to about 10 parts by mole based on 100 parts by mole of the interpenetrating polymer network (IPN) structure.

The binder composition may further include polyalkylene glycol including a structural unit represented by Chemical Formula 4.

Chemical Formula 4

In Chemical Formula 4, i is an integer of 1 to 5, and q is an integer of 1 to 500.

The polyalkylene glycol may be included in the binder composition in an amount of about 5 mol % to about 50 mol % based on the total moles of the binder composition.

The polyalkylene glycol may have a weight average molecular weight of about 400 g/mol to about 100,000 g/mol.

According to another embodiment, an electrode for a rechargeable lithium battery includes: an active material; and the binder composition.

The active material may include Si, $SiO_x$, a Si—C composite, a Si-Q alloy, graphite, or a combination thereof, where 0<x<2, and Q is an alkali metal, an alkaline-earth metal, Group 13 to 16 elements, a transition metal, a rare earth element, or a combination thereof with the proviso that Q is not Si.

According to yet another embodiment, a rechargeable lithium battery includes a positive electrode; a negative electrode; and an electrolyte, where at least one of the positive electrode and the negative electrode is the electrode.

According to still another embodiment, a method of preparing a binder composition for a rechargeable lithium battery includes: preparing a cyclic polymer including a structural unit represented by Chemical Formula 1 or a structural unit represented by Chemical Formula 2; and adding an acrylamide monomer to a solution including the cyclic polymer to form an interpenetrating polymer network (IPN) structure of the cyclic polymer and the polyacrylamide.

The method may further include adding an alkali metal compound to the formed interpenetrating polymer network (IPN) structure.

The method may further include adding polyalkylene glycol including a structural unit represented by Chemical Formula 4 to a solution including the cyclic polymer before forming the interpenetrating polymer network (IPN) structure.

Other embodiments are included in the following detailed description.

In some embodiments, the binder composition for a rechargeable lithium battery controls volume expansion of an active material effectively, has improved adherence, and/or has stability with respect to an electrolyte, and thus provides a rechargeable lithium battery having excellent initial efficiency, cycle-life characteristics, and battery stability.

BRIEF DESCRIPTION OF THE DRAWINGS

The accompanying drawings, together with the specification, illustrate embodiments of the present invention, and, together with the description, serve to explain the principles of the present invention.

DETAILED DESCRIPTION

Hereinafter, embodiments of the present invention are illustrated in more detail. However, these embodiments are exemplary, and this disclosure is not limited thereto. As those skilled in the art would recognize, the invention may be embodied in many different forms and should not be construed as being limited to the embodiments set forth herein. Expressions such as "at least one of," when preceding a list of elements, modify the entire list of elements and do not modify the individual elements of the list. Further, the use of "may" when describing embodiments of the present invention refers to "one or more embodiments of the present invention." As used herein, the terms "use," "using," and "used" may be considered synonymous with the terms "utilize," "utilizing," and "utilized," respectively.

As used herein, when a definition is not otherwise provided, the term "substituted" may refer to substitution of at least one hydrogen of a compound with a halogen; a C1 to C30 alkyl group; a C2 to C30 alkenyl group, a C2 to C30 alkynyl group, a C1 to C10 alkylsilyl group; a C3 to C30 cycloalkyl group; a C6 to C30 aryl group; a C1 to C30 heteroaryl group; or a C1 to C10 alkoxy group.

As used herein, when a definition is not otherwise provided, the term "hetero" may refer to one selected from N, O, S, and P.

As used herein, when a definition is not otherwise provided, the term "alkyl group" may refer to "a saturated alkyl group" without any alkenyl group or alkynyl group (e.g., the saturated alkyl group does not include an alkenyl group or an alkynyl group); or "an unsaturated alkyl group" including at least one alkenyl group or alkynyl group. The term "alkenyl group" may refer to a substituent having at least one carbon-carbon double bond of at least two carbon atoms, and the term "alkynyl group" may refer to a substituent having at least one carbon-carbon triple bond of at least two carbon atoms. The alkyl group may be a branched, linear, or cyclic alkyl group.

The alkyl group may be a C1 to C20 alkyl group, for example, a C1 to C6 lower alkyl group, a C7 to C10 medium-sized alkyl group, or a C11 to C20 higher alkyl group.

For example, a C1 to C4 alkyl group may have 1 to 4 carbon atoms in an alkyl chain and may be selected from methyl, ethyl, propyl, iso-propyl, n-butyl, isobutyl, sec-butyl, and t-butyl.

Examples of the alkyl group may include a methyl group, an ethyl group, a propyl group, an isopropyl group, a butyl group, an isobutyl group, a t-butyl group, a pentyl group, a hexyl group, an ethenyl group, a propenyl group, a butenyl group, a cyclopropyl group, a cyclobutyl group, a cyclopentyl group, a cyclohexyl group and the like.

The "aryl group" may refer to a conjugated (or aromatic) cyclic substituent and may refer to a monocyclic or fused ring (i.e., a plurality of rings sharing adjacent pairs of carbon atoms).

The substituted or unsubstituted C6 to C30 aryl group may be, for example a substituted or unsubstituted phenyl group, a substituted or unsubstituted naphthyl group, a substituted or unsubstituted anthracenyl group, a substituted or unsubstituted phenanthryl group, a substituted or unsubstituted naphthacenyl group, a substituted or unsubstituted pyrenyl group, a substituted or unsubstituted biphenylyl group, a substituted or unsubstituted p-terphenyl group, a substituted or unsubstituted m-terphenyl group, a substituted or unsubstituted chrysenyl group, a substituted or unsubstituted triphenylenyl group, a substituted or unsubstituted perylenyl group, a substituted or unsubstituted indenyl group, or a combination thereof, but the substituted or unsubstituted C6 to C30 aryl group is not limited thereto.

As used herein, when a definition is not otherwise provided, the term "copolymerization" may refer to block copolymerization, random copolymerization, graft copolymerization, or alternating copolymerization, and the term "copolymer" may refer to a block copolymer, a random copolymer, a graft copolymer, or an alternating copolymer.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it may be directly on the other element or intervening elements may also be present (e.g., the element may be indirectly on the other element). In contrast, when an element is referred to as being "directly on" another element, there are no intervening elements present.

A binder composition for a rechargeable lithium battery according to one embodiment includes an interpenetrating polymer network (IPN) structure including a cyclic polymer and polyacrylamide.

The interpenetrating polymer network (IPN) may refer to a combination of heterogeneous polymer networks without a covalent bond (e.g., without a covalent bond between two polymer networks of the heterogeneous polymer networks). For example, although each polymer network of the heterogeneous polymer networks includes a plurality of covalent bonds, the combination of heterogeneous polymer networks may include two polymer networks that are not covalently bonded to one another. An interpenetrating polymer network (IPN) structure according to one embodiment may be a structure that a network (e.g., a first network) including or formed of the cyclic polymer and a network (e.g., a second network) including or formed of the polyacrylamide are interwound or intertangled with each other and form another network, or that the network of the cyclic polymer and a chain of the polyacrylamide are interwound or intertangled with each other. The interpenetrating polymer network (IPN) structure of these embodiments may have strong and tough characteristics and concurrently or simultaneously, excellent flexibility as compared with a common copolymer (e.g., a copolymer that does not have an IPN structure), since the networked polymers are connected with one another like a net. Accordingly, an embodiment of the binder composition including the interpenetrating polymer network (IPN) structure may control expansion of an active material effectively, have improved adherence, and/or have stability with respect to an electrolyte. In addition, the binder composition may be used with an aqueous solvent and thus is environment-friendly. An embodiment of a rechargeable lithium battery including the binder composition may realize high capacity and excellent initial efficiency, charge and discharge characteristics, and/or cycle-life characteristics.

The cyclic polymer may include a structural unit (e.g., a repeating unit) represented by the following Chemical Formula 1 or a structural unit (e.g., a repeating unit) represented by the following Chemical Formula 2.

Chemical Formula 1

Chemical Formula 2

In the above Chemical Formulae 1 and 2,

$R^1$, $R^2$, $R^{11}$, $R^{12}$, $R^{14}$ and $R^{15}$ are the same or different and are independently selected from hydrogen, a substituted or unsubstituted C1 to C5 alkyl group, or —$(CH_2)_p$—$COOX^1$ (where p is an integer ranging from 1 to 5, and $X^1$ is an alkali metal),

$R^3$, $R^{13}$ and $R^{16}$ are the same or different and are independently —$OR^4$, —$NHR^5$ or —$COOX^2$, $X^2$ is an alkali metal, $R^4$ is hydrogen, a substituted or unsubstituted C1 to C5 alkyl group, or —$(CH_2)_p$—$COOX^1$, p being an integer of 1 to 5, and $X^1$ being an alkali metal, and $R^5$ is hydrogen or —$COCH_3$, and n and m are independently integers of 5 to 20,000, or, for example, 10 to 10,000.

When the interpenetrating polymer network (IPN) structure includes or is formed by using a cyclic polymer having cyclic structures repetitively connected to one another as shown in the above Chemical Formulae 1 and 2, the cyclic polymer may further strengthen the IPN structure and introduce thereinto a conjugation function related to electrical conductivity. When the interpenetrating polymer network (IPN) structure using this cyclic polymer is used as a binder, tensile strength and elastic strength may be increased. Accordingly, expansion of an active material, for example, a Si-based active material may be effectively controlled, and excellent cycle-life characteristics and stability of a battery may also be obtained.

For example, the cyclic polymer may include one of structural units (e.g., repeating units) represented by the following Chemical Formulae 3-1 to 3-6.

Chemical Formula 3-1

Chemical Formula 3-2

Chemical Formula 3-3

Chemical Formula 3-4

Chemical Formula 3-5

Chemical Formula 3-6

In the above Chemical Formulae 3-1 to 3-6, $n^1$ to $n^5$ and $m^1$ are integers of 5 to 20,000, or, for example, 10 to 10,000.

The structural unit (e.g., the repeating unit) represented by the above Chemical Formula 1 may be, for example, derived from chitin, chitosan, cellulose, methyl cellulose, carboxylmethyl cellulose, starch, and/or the like, and the structural unit (e.g., the repeating unit) represented by the above Chemical Formula 2 may be, for example, derived from sodium alginate and/or the like.

The cyclic polymer may have a weight average molecular weight of about 2,000 g/mol to about 2,000,000 g/mol, or, for example, about 10,000 g/mol to about 1,000,000 g/mol. When the weight average molecular weight of the cyclic polymer is within any of the foregoing ranges, the interpenetrating polymer network (IPN) structure including the polyacrylamide may be formed effectively.

The polyacrylamide may have a weight average molecular weight of about 5,000 g/mol to about 1,000,000 g/mol, or, for example, about 10,000 g/mol to about 500,000 g/mol. When the weight average molecular weight of the polyacrylamide is within any of the foregoing ranges, the interpenetrating polymer network (IPN) structure including the cyclic polymer may be formed effectively.

The cyclic polymer and the polyacrylamide may form the interpenetrating polymer network (IPN) structure at a mole ratio of about 1:9 to about 9:1, for example, about 1:9 to about 8:2, or about 3:7 to about 7:3. When the cyclic polymer and the polyacrylamide are used within any of the foregoing mole ratio ranges to form an interpenetrating polymer network (IPN) structure, excellent adherence and flexibility may not only be secured but a binder composition including the interpenetrating polymer network (IPN) structure may also effectively control expansion of an active material.

The binder composition may further include an alkali metal ion. The binder composition, including the interpenetrating polymer network (IPN) structure and the alkali metal ion, may improve charge and/or discharge characteristics of a rechargeable lithium battery.

The alkali metal ion may be, for example $Li^+$, $Na^+$, $K^+$, $Rb^+$, $Cs^+$, and/or the like.

The alkali metal ion may be included in the binder composition in an amount of about 1 part by mole to about 10 parts by mole, for example, about 1 part by mole to about 9 parts by mole, about 1 part by mole to about 8 parts by mole, or about 1 part by mole to about 7 parts by mole based on 100 parts by mole of the interpenetrating polymer network (IPN) structure. When the alkali metal ion is included within any of the above ranges, charge and discharge characteristics of a battery may be improved.

The binder composition may further include an alkali metal ion and a phosphorus (P)-based compound. When the binder composition further includes an alkali metal ion and a phosphorus-based compound, gas generation may be suppressed during manufacture of an electrode using the binder composition and during battery charge and discharge. Accordingly, cycle-life characteristics and initial efficiency are improved, and a rechargeable lithium battery having stable charge and discharge characteristics may be realized.

The phosphorus-based compound may be phosphorus, or a phosphorus-containing compound. The phosphorus-based compound may be, for example, a phosphorus-based anion, such as a phosphorus-containing anion. For example, the phosphorus-based compound may include a phosphate anion, for example, $PO_4^{3-}$, $HPO_4^{2-}$, $H_2PO_4^{-}$, or a combination thereof.

The alkali metal ion and the phosphorus-based compound may have a structure where they are adsorbed on the interpenetrating polymer network (IPN) structure.

The alkali metal ion may be included in the binder composition in an amount of about 1 part by mole to about 10 parts by mole, for example, about 1 part by mole to about 9 parts by mole, about 1 part by mole to about 8 parts by mole, or about 1 part by mole to about 7 parts by mole based on 100 parts by mole of the interpenetrating polymer network (IPN) structure. The phosphorus-based compound may be included in the binder composition in an amount of about 1 part by mole to about 10 parts by mole, for example, about 1 part by mole to about 9 parts by mole, about 1 part by mole to about 8 parts by mole, or about 1 part by mole to about 7 parts by mole based on 100 parts by mole of the interpenetrating polymer network (IPN) structure. When the alkali metal ion and the phosphorus-based compound are included within any of the above ranges, gas generation is suppressed or reduced and thus stable charge and discharge characteristics of a battery may be realized.

The binder composition may further include polyalkylene glycol. Herein, the polyalkylene glycol may be blended with the interpenetrating polymer network (IPN) structure. An embodiment of the binder composition for a rechargeable lithium battery further includes polyalkylene glycol and thus, may improve a problem that a binder layer is cracked and an electrode plate is bent when coated and also, improve a density of a wet film and thus, increase a loading level of an electrode.

The polyalkylene glycol may, for example, include a structural unit (e.g., a repeating unit) represented by the following Chemical Formula 4.

Chemical Formula 4

In the above Chemical Formula 4,
i is an integer ranging from 1 to 5, and
q is an integer ranging from 1 to 500, or for example, 5 to 200.

In some embodiments, the polyalkylene glycol may be for example, polymethylene glycol, polyethylene glycol, polypropylene glycol, polybutylene glycol, polyisobutylene glycol, and/or the like.

The polyalkylene glycol may have a molecular weight of about 400 g/mol to about 100,000 g/mol, for example, about 400 g/mol to about 50,000 g/mol, or about 1,000 g/mol to about 30,000 g/mol. When the weight average molecular weight of the polyalkylene glycol is included within any of the foregoing ranges, slurry dispersion may be improved.

The polyalkylene glycol may be included in the binder composition in an amount of about 5 mol % to about 50 mol %, for example, about 5 mol % to about 40 mol %, or about 5 mol % to about 30 mol % based on the total amount (e.g., moles) of the binder composition. When the polyalkylene glycol is included within any of the above ranges, the binder composition including the polyalkylene glycol may effectively control expansion of an active material and concurrently or simultaneously improve a problem that a binder layer is cracked or bent when the binder is dried and also, improve a density of a wet film and thus, increase a loading level of an electrode.

The binder composition may further include a solvent.

The solvent may be an organic solvent or an aqueous solvent. The binder composition may be used with an aqueous solvent and thus is environmentally-friendly.

The binder composition may have pH of about 4 to about 9, and when the binder composition further includes the phosphorus-based compound, the pH may be about 4 to about 8, or, for example, about 5 to about 8.

The binder composition may have a viscosity of about 10,000 cps to about 100,000 cps, for example about 10,000 cps to about 80,000 cps, about 10,000 cps to about 50,000 cps, or about 10,000 cps to about 30,000 cps.

The interpenetrating polymer network (IPN) structure may be formed by any suitable method that is available in this art. For example, in some embodiments, a first polymer is synthesized and swelled primarily, then, a monomer of a second polymer, a cross-linking agent, an initiator, and/or the like are added (e.g., added to, or combined with, the first polymer), and the second polymer is synthesized in the presence of the first polymer. As another example, if a first polymer and a second polymer are synthesized according to a different mechanism from each other, a monomer or prepolymer (or oligomer) of the first polymer, a monomer or prepolymer (or oligomer) of the second polymer, a cross-linking agent, initiator, and/or the like are mixed to perform cross-linking polymerization of the first polymer and the second polymer concurrently or simultaneously and to form the interpenetrating polymer network structure.

The binder composition according to one embodiment may be prepared as follows.

The above cyclic polymer is prepared, a solution including the cycle polymer is prepared, an acrylamide monomer is added to the solution including the cyclic polymer and polymerized (polymerized in the presence of the cyclic polymer) to form the interpenetrating polymer network (IPN) structure including the cyclic polymer and the polyacrylamide.

The binder composition prepared by the foregoing method may control expansion of an active material, have excellent adherence, and have stability with an electrolyte. In some embodiments, the binder composition may be used with an aqueous solvent and thus is environment-friendly. A rechargeable lithium battery including the binder composition may realize high capacity and excellent initial efficiency, charge and discharge characteristics, and/or cycle-life characteristics.

In embodiments of the preparation method, a cross-linking agent, a polymerization initiator, and/or the like may be added with the acrylamide monomer.

Examples of the polymerization initiator may include ammonium persulfate, sodium persulfate, potassium persulfate, hydrogen peroxide, 2,2-azobis-(2-amidinopropane)dihydrochloride, 2,2-azobis-(N,N-dimethylene)isobutyramidine dihydrochloride, 2-(carbamoylazo)isobutyronitrile, 2,2-azobis[2-(2-imidazolin-2-yl)propane]dihydrochloride, 4,4-azobis-(4-cyanovaleric acid), ascorbic acid, benzoyl peroxide, dibenzoyl peroxide, lauryl peroxide, ditertiarybutyl peroxide, and the like.

In embodiments of the method of preparing the binder composition, after forming the interpenetrating polymer network (IPN) structure, an alkali metal compound may be added to the formed interpenetrating polymer network (IPN) structure.

The alkali metal compound refers to an alkali metal-containing compound, and may be, for example an alkali metal hydroxide, an alkali metal salt, and/or the like. Herein, examples of the alkali metal may include lithium, sodium, potassium, rubidium, cesium, and the like.

The alkali metal compound may be, for example, a compound including an alkali metal and phosphorus, such as a metal phosphate-based compound. For example, the compound including an alkali metal and phosphorus may be a lithium phosphate-based compound, for example, $LiH_2PO_4$, $Li_2HPO_4$, $Li_3PO_4$, or a combination thereof.

Accordingly, embodiments of the prepared binder composition may include the alkali metal ion, or the alkali metal ion and the phosphorus-based compound. For example, the alkali metal ion and the phosphorus-based compound may be adsorbed on the interpenetrating polymer network (IPN) structure. Accordingly, charge and discharge characteristics of a battery may be improved. The phosphorus-based compound may be phosphorus or a phosphorus-containing compound. The phosphorus-based compound may include a phosphate anion, for example $PO_4^{3-}$, $HPO_4^{2-}$, $H_2PO_4^-$, or a combination thereof.

The alkali metal compound may be added in an amount of about 1 part by mole to about 10 parts by mole, for example, about 1 part by mole to about 9 parts by mole, about 1 part by mole to about 8 parts by mole, or about 1 part by mole to about 7 parts by mole based on 100 parts by mole of the interpenetrating polymer network (IPN) structure. In this case, gas generation may be effectively suppressed or reduced, and thus stable charge and discharge characteristics of a battery may be realized.

In the method of preparing the binder composition, the polyalkylene glycol may be added to the solution including the cyclic polymer before forming the interpenetrating polymer network (IPN) structure. Accordingly, the binder composition may have a structure that the interpenetrating polymer network (IPN) structure and the polyalkylene glycol are blended. Herein, a problem that a binder layer is cracked, or an electrode is bent is improved when the binder composition is coated and dried, and in addition, a loading level of an electrode may be increased due to density improvement of a wet film.

The polyalkylene glycol may be included in the binder composition in an amount of about 5 mol % to about 50 mol %, for example, about 5 mol % to about 40 mol %, or 5 mol % to 30 mol % based on the total amount (e.g., moles) of the binder composition. Herein, a problem that an electrode is cracked or bent is improved when the binder composition is dried, and in addition, a loading level of an electrode may be increased due to density improvement of a wet film.

In another embodiment of the present invention, a rechargeable lithium battery including the above-described binder composition is provided.

The electrode may include an active material and the above binder composition.

The active material may include a silicon-based compound, graphite, or a combination thereof. For example, the active material may include Si, $SiO_x$, a Si—C composite, Si-Q alloy, graphite, or a combination thereof. Herein, x is in the range of 0<x<2, and Q is an alkali metal, an alkaline-earth metal, a Group 13 to 16 element, a transition element, a rare earth element, or a combination thereof, but not Si.

The silicon-based active material has a large capacity but undergoes volume expansion as a cycle goes, and a cycle-life of a battery may be deteriorated (e.g., after repeated charge and discharge cycles). When the silicon-based active material is used with the above-described binder composition, the binder composition may effectively control volume expansion of the silicon-based active material, and cycle-life characteristics of a battery may be improved. Accordingly, a rechargeable lithium battery having high charge and discharge capacity and concurrently or simultaneously, excellent cycle-life characteristics and stability may be provided.

The electrode may include a positive electrode and a negative electrode, and the binder composition according to one embodiment may be used in either a positive electrode or a negative electrode.

Figure 1:
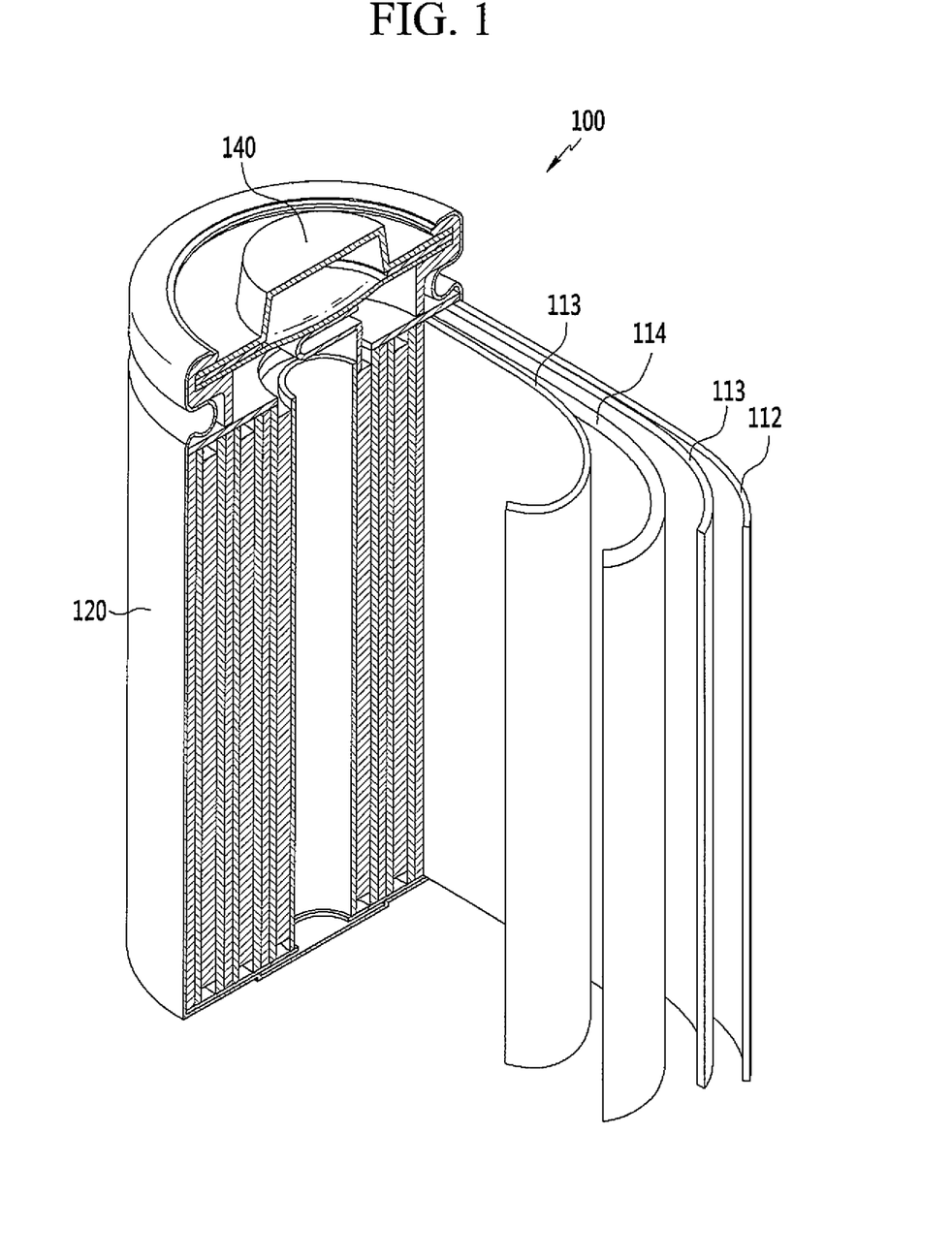
FIG. 1 is a schematic view showing a rechargeable lithium battery cell according to one embodiment of the present invention.

A rechargeable lithium battery including the electrode is described referring to FIG. 1.

FIG. 1 is a schematic view showing a structure of a rechargeable lithium battery according to one embodiment.

Referring to FIG. 1, the rechargeable lithium battery 100 according to one embodiment includes an electrode assembly (including a positive electrode 114, a negative electrode 112 facing the positive electrode 114, a separator 113 interposed between the positive electrode 114 and the negative electrode 112), and an electrolyte impregnating the positive electrode 114, the negative electrode 112 and the separator 113, a battery case 120 housing the electrode assembly, and a sealing member 140 sealing the battery case 120.

The negative electrode 112 includes a current collector and a negative active material layer on or formed on the current collector.

The current collector may include a copper foil, a nickel foil, a stainless steel foil, a titanium foil, a nickel foam, a copper foam, a polymer substrate coated with a conductive metal, or a combination thereof.

The negative active material layer includes a negative active material, the binder composition, and, optionally, a conductive material.

The negative active material may include a material that reversibly intercalates/deintercalates lithium ions, a lithium metal, a lithium metal alloy, a material capable of doping and dedoping lithium, and/or a transition metal oxide.

In some embodiments, the material that reversibly intercalates/deintercalates lithium ions is a carbon material, and may be any suitable, generally-used carbon-based negative active material in a rechargeable lithium ion battery, and examples thereof may include crystalline carbon, amorphous carbon, and a combination thereof. Examples of the crystalline carbon may include a graphite such as a shapeless, sheet-shaped, flake, spherical shaped or fiber-shaped natural graphite and artificial graphite, and examples of the amorphous carbon may include soft carbon, hard carbon, a mesophase pitch carbonized product, fired cokes, and the like.

The lithium metal alloy may include an alloy of lithium and a metal of Na, K, Rb, Cs, Fr, Be, Mg, Ca, Sr, Si, Sb, Pb, In, Zn, Ba, Ra, Ge, Al, and/or Sn.

The material capable of doping and dedoping lithium may be Si, $SiO_x$ (0<x<2), a Si—C composite, a Si-Q alloy (where Q is an alkali metal, an alkaline-earth metal, a Group 13 to 16 element, a transition metal, a rare earth element, or a combination thereof, and not Si), Sn, $SnO_2$, a Sn—C composite, Sn—R (where R is an alkali metal, an alkaline-earth metal, a Group 13 to 16 element, a transition metal, a rare earth element, or a combination thereof, and not Sn), and/or the like. Examples of the Q and R may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

The transition metal oxide may be vanadium oxide, lithium vanadium oxide, and/or the like.

In one embodiment, the negative active material may be, for example, Si, $SiO_x(0<x<2)$, a Si—C composite, a Si-Q alloy (where Q is an alkali metal, an alkaline-earth metal, a Group 13 to 16 element, a transition metal, a rare earth element, or a combination thereof, but not Si), graphite, or a combination thereof.

The binder may include the above-described binder composition, and/or a generally-used binder. In one embodiment, the above binder composition may be utilized.

Examples of the generally-used binder may include polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

The conductive material improves electrical conductivity of an electrode. Any suitable electrically conductive material may be used as a conductive material, unless it causes a chemical change (e.g., a chemical change of other components of the negative active material layer and/or the battery). Examples thereof may include natural graphite, artificial graphite, carbon black, acetylene black, ketjen black, carbon fiber, copper, nickel, aluminum, silver, and the like, a metal powder or a metal fiber (e.g., of copper, nickel aluminum, silver and the like), and the like. One or more kinds of a conductive material, such as a polyphenylene derivative and the like, may be mixed.

The positive electrode 114 includes a current collector and a positive active material layer on or formed on the current collector.

The current collector may be Al, but is not limited thereto.

The positive active material layer includes a positive active material, a binder, and, optionally, a conductive material.

The positive active material may include lithiated intercalation compounds that reversibly intercalate and deintercalate lithium ions. For example, at least one lithium metal composite oxide of lithium and a metal of cobalt, manganese, nickel, or a combination thereof may be used, and examples thereof may include a compound represented by one of the following chemical formulae. $Li_aA_{1-b}R_bD_2$ ($0.90 \leq a \leq 1.8$ and $0 \leq b \leq 0.5$); $Li_aE_{1-b}R_bO_{2-c}D_c$ ($0.90 \leq a \leq 1.8$, $0 \leq b \leq 0.5$ and $0 \leq c \leq 0.05$); $Li_aE_{2-b}R_bO_{4-c}D_c$ ($0.90 \leq a \leq 1.8$, $0 \leq b \leq 0.5$, $0 \leq c \leq 0.05$); $Li_aNi_{1-b-c}Co_bR_cD_\alpha$ ($0.90 \leq a \leq 1.8$, $0 \leq b \leq 0.5$, $0 \leq c \leq 0.05$ and $0 < \alpha \leq 2$); $Li_aNi_{1-b-c}Co_bR_cO_{2-\alpha}Z_\alpha$ ($0.90 \leq a \leq 1.8$, $0 \leq b \leq 0.5$, $0 \leq c \leq 0.05$ and $0 \leq \alpha \leq 2$); $Li_aNi_{1-b-c}Co_bR_cO_{2-\alpha}Z_2$ ($0.90 \leq a \leq 1.8$, $0 \leq b \leq 0.5$, $0 \leq c \leq 0.05$ and $0 < \alpha < 2$); $Li_aNi_{1-b-c}Mn_bR_cD_\alpha$ ($0.90 \leq a \leq 1.8$, $0 \leq b \leq 0.5$, $0 \leq c \leq 0.05$ and $0 < \alpha \leq 2$); $Li_aNi_{1-b-c}Mn_bR_cO_{2-\alpha}Z_\alpha$ ($0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z_2$ ($0.90 \leq a \leq 1.8$, $0 \leq b \leq 0.5$, $0 \leq c \leq 0.05$ and $0 < \alpha < 2$); $Li_aN i_bE_cG_dO_2$ ($0.90 \leq a \leq 1.8$, $0 \leq b \leq 0.9$, $0 \leq c \leq 0.5$ and $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$ and $0.001 \leq e \leq 0.1$); $Li_aNiG_bO_2$ ($0.90 \leq a \leq 1.8$ and $0.001 \leq b \leq 0.1$); $Li_aCoG_bO_2$ ($0.90 \leq a \leq 1.8$ and $0.001 \leq b \leq 0.1$); $Li_aMnG_bO_2$ ($0.90 \leq a \leq 1.8$ and $0.001 \leq b \leq 0.1$); $Li_aMn_2G_bO_4$ ($0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulae, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu or a combination thereof.

The positive active material may include the positive active material with a coating layer, or a compound of the active material and the active material coated with the coating layer. The coating layer may include a coating element compound of an oxide of the coating element, a hydroxide of the coating element, an oxyhydroxide of the coating element, an oxycarbonate of the coating element, or a hydroxycarbonate of the coating element. The compound for the coating layer may be either amorphous or crystalline. The coating element included in the coating layer may be Mg, Al, Co, K, Na, Ca, Si, Ti, V, Sn, Ge, Ga, B, As, Zr, or a mixture thereof. The coating process may include any suitable processes (e.g., spray coating, dipping) as long as it does not causes any side effects on the properties of the positive active material. Such coating processes should be apparent to persons having ordinary skill in this art, so further description thereof is not necessary here.

The binder composition may include the above-described binder composition, and/or a generally-used binder.

Examples of the generally-used binder may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but the binder is not limited thereto.

The conductive material improves electrical conductivity of an electrode. Any suitable electrically conductive material may be used as a conductive material, unless it causes a chemical change (e.g., a chemical change in other components of the positive active material layer and/or battery). Examples thereof may include natural graphite, artificial graphite, carbon black, acetylene black, ketjen black, carbon fiber, copper, nickel, aluminum, silver, and the like, a metal powder or a metal fiber (e.g., of copper, nickel aluminum, silver and the like), and the like. One or more kinds of a conductive material, such as a polyphenylene derivative and the like, may be mixed.

The negative electrode 112 and the positive electrode 114 may be manufactured by mixing the respective active material, the conductive material, and the binder in a solvent to prepare an active material composition, and coating the active material composition on a current collector. The electrode preparation method should be apparent to those of ordinary skill in this art, and thus, further description thereof is not necessary here.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, and/or aprotic solvent. The carbonate-based solvent may include dimethyl carbonate (DMC), diethyl carbonate (DEC), dipropyl carbonate (DPC), methylpropyl carbonate

(MPC), ethylpropyl carbonate (EPC), methylethyl carbonate (MEC), ethylene carbonate (EC), propylene carbonate (PC), butylene carbonate (BC), and/or the like. The ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and/or the like. The ether-based solvent may include dibutyl ether, tetraglyme, diglyme, dimethoxyethane, 2-methyltetrahydrofuran, tetrahydrofuran and/or the like. The ketone-based solvent may include cyclohexanone, and/or the like. The alcohol-based solvent may include ethanol, isopropyl alcohol, and/or the like. The aprotic solvent include nitriles such as R—CN (where R is a C2 to C20 linear, branched, or cyclic hydrocarbon group, and may include a double bond, an aromatic ring, or an ether bond), amides such as dimethylformamide, dioxolanes such as 1,3-dioxolane, sulfolanes, and/or the like.

The non-aqueous organic solvent may be used singularly or in a mixture. When the organic solvent is used in a mixture, the mixture ratio may be controlled in accordance with a suitable or desirable battery performance.

In some embodiments, the carbonate-based solvent is prepared by mixing a cyclic carbonate and a linear carbonate. The cyclic carbonate and the linear carbonate are mixed together at a volume ratio of about 1:1 to about 1:9, which may enhance performance of an electrolyte.

In some embodiments, the non-aqueous organic solvent of the present invention includes an aromatic hydrocarbon-based organic solvent as well as the carbonate based solvent. The carbonate-based solvent and the aromatic hydrocarbon-based organic solvent are mixed together at a volume ratio of about 1:1 to about 30:1.

The aromatic hydrocarbon-based organic solvent may be an aromatic hydrocarbon-based compound represented by the following Chemical Formula A.

Chemical Formula A

In the above Chemical Formula A, $R_{101}$ to $R_{106}$ are the same or different and are selected from hydrogen, a halogen, a C1 to C10 alkyl group, a haloalkyl group, and a combination thereof.

Examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous electrolyte may further include vinylene carbonate or an ethylene carbonate-based compound represented by the following Chemical Formula B in order to improve cycle-life of a battery.

Chemical Formula B

In the above Chemical Formula B, $R_{107}$ and $R_{108}$ are the same or different and are selected from hydrogen, a halogen, a cyano group (CN), a nitro group ($NO_2$), and a fluorinated C1 to C5 alkyl group, provided that at least one of $R_7$ and $R_8$ is selected from a halogen, a cyano group (CN), a nitro group ($NO_2$), and a fluorinated C1 to C5 alkyl group, and $R_7$ and $R_8$ are not both or simultaneously hydrogen.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The use amounts of additives for improving cycle life may be adjusted within a suitable or appropriate range.

The lithium salt is dissolved in the non-aqueous solvent and supplies lithium ions in a rechargeable lithium battery, and basically operates the rechargeable lithium battery and improves lithium ion transfer between positive and negative electrodes. The lithium salt may include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where, x and y are natural numbers, e.g. an inter of 1 to 20), LiCl, LiI, $LiB(C_2O_4)_2$ (lithium bis(oxalato) borate, LiBOB), and a combination thereof. The lithium salt may be used in a concentration of about 0.1 M to about 2.0M. When the lithium salt is included at the above concentration range, an electrolyte may have excellent performance and/or lithium ion mobility due to suitable or optimal electrolyte conductivity and/or viscosity.

The separator may include any suitable materials available in the art of lithium batteries as long as the materials are capable of separating a negative electrode from a positive electrode and providing a transporting passage of lithium ion. In other words, it may have a low resistance to ion transport and an excellent impregnation for electrolyte. For example, it may be selected from glass fiber, polyester, polyethylene, polypropylene, polytetrafluoroethylene (PTFE), and a combination thereof. It may have a form of a non-woven fabric or a woven fabric. For example, a polyolefin-based polymer separator such as polyethylene, polypropylene or the like is mainly used. In order to ensure the heat resistance or mechanical strength, a coated separator including a ceramic component or a polymer material may be used. Selectively, it may have a mono-layered or multi-layered structure. Examples of the multi-layered structure may be a polyethylene/polypropylene double-layered separator, a polyethylene/polypropylene/polyethylene triple-layered separator, a polypropylene/polyethylene/polypropylene triple-layered separator, and the like.

Hereinafter, examples of the present invention and comparative examples are described. These examples, however, are not in any sense to be interpreted as limiting the scope of the invention.
(Preparation of Binder Composition)

PREPARATION EXAMPLE 1

390 g of deionized water, 30 g of sodium alginate (having a weight average molecular weight of 250,000 g/mol), and 30 g of polyethyleneglycol (having a weight average molecular weight of 20,000 g/mol) were put in a 2 L reaction vessel equipped with a heater, a cooler, and an agitator; and the reaction vessel was heated to 80° C. under a nitrogen atmosphere and maintained at the same or substantially the same temperature (80° C.) for 3 hours. Then, a solution obtained by dissolving 0.125 g of ammonium persulfate in 10 g of deionized water was added to the reaction vessel to form a mixture. After maintaining the mixture at 80° C. for 20 minutes, an aqueous solution obtained by dissolving 58 g of acrylamide in 180 g of deionized water was added thereto in a dropwise fashion for 2 hours. Subsequently, the resultant was maintained at 80° C. and reacted for 1 hour and cooled down to a temperature less than or equal to 40° C., an aqueous solution obtained by dissolving 2.9 g of lithium phosphate to 50 g of deionized water was added thereto in a dropwise fashion for 10 minutes, and the mixture was maintained at 40° C. for 30 minutes.

In this way, a binder composition including an interpenetrating polymer network (IPN) structure, $Li^+$ and $H_2PO_4^-$, and polyethyleneglycol was prepared. Here, the interpenetrating polymer network (IPN) structure included or was formed by a cyclic polymer (having a weight average molecular weight of 250,000 g/mol) including a structural unit (e.g., a repeating unit) represented by the following Chemical Formula 3-6 and polyacrylamide (having a weight average molecular weight of 400,000 g/mol) at a mole ratio of 4:6.

Chemical Formula 3-6

The binder composition of Preparation Example 1 includes a solid content of 16 wt %, and has a pH of 6.0 and a viscosity of 18,000 cps. The alkali metal ion (Li) was included in an amount of 1.7 parts by mole based on 100 parts by mole of the interpenetrating polymer network structure in the bindedr composition. Furthermore, $H_2PO_4^-$ was included in an amount of 1.7 parts by mole based on 100 parts by mole of the interpenetrating polymer network structure in the bindedr composition.

PREPARATION EXAMPLE 2

Preparation Example 2 was prepared as described in Preparation Example 1 except that Preparation Example 2 was prepared without using lithium phosphate.

In this way, a binder composition including the interpenetrating polymer network (IPN) structure according to Preparation Example 1 and polyethyleneglycol was prepared.

The binder composition of Preparation Example 2 includes a solid content of 16 wt %, and has a pH 6.5 and a viscosity of 15,000 cps.

PREPARATION EXAMPLE 3

Preparation Example 3 was prepared as described in Preparation Example 1 except that Preparation Example 3 was prepared without using polyethylene glycol.

In this way, a binder composition including the interpenetrating polymer network (IPN) structure according to Preparation Example 1 was prepared.

The binder composition of Preparation Example 3 includes a solid content of 13.1 wt %, and has a pH 6.5 and a viscosity of 25,000 cps.

PREPARATION EXAMPLE 4

Preparation Example 4 was prepared as described in Preparation Example 1 except that Preparation Example 4 was prepared using chitosan (having a weight average molecular weight of 100,000 g/mol) instead of the sodium alginate of Preparation Example 1.

In this way, a binder composition including an interpenetrating polymer network (IPN) structure, $Li^+$ and $H_2PO_4^-$ and polyethyleneglycol was prepared. Here, the interpenetrating polymer network (IPN) structure included or was formed by a cyclic polymer (having a weight average molecular weight of 100,000 g/mol) including a structural unit (e.g., a repeating unit) represented by the following Chemical Formula 3-1 and polyacrylamide (having a weight average molecular weight of 400,000 g/mol) at a mole ratio of 6.7:3.3.

Chemical Formula 3-1

The binder composition of Preparation Example 4 includes a solid content of 16 wt %, and has a pH 5.0 and a viscosity of 5,000 cps.

COMPARATIVE PREPARATION EXAMPLE 1

600 g of deionized water, 30 g of sodium alginate (having a weight average molecular weight of 250,000 g/mol), and 70 g of acrylamide were put in a 2 L reaction vessel equipped with a heater, a cooler, and an agitator; and the reaction vessel was heated to 33° C. under a nitrogen atmosphere. Then, 15 ml of a ceric ammonium nitrate solution was added to the reaction vessel to form a mixture, and the mixture was maintained at 33° C. for 14 hours, thereby preparing a binder composition including a sodium alginate-g-polyacrylamide copolymer.

The binder composition of Comparative Preparation Example 1 includes a solid content of 14.3 wt %, and has a pH 6.3 and a viscosity of 27,000 cps.

Evaluation 1: Infrared Ray (IR) Spectroscopy Analysis of Binder

Figure 2:
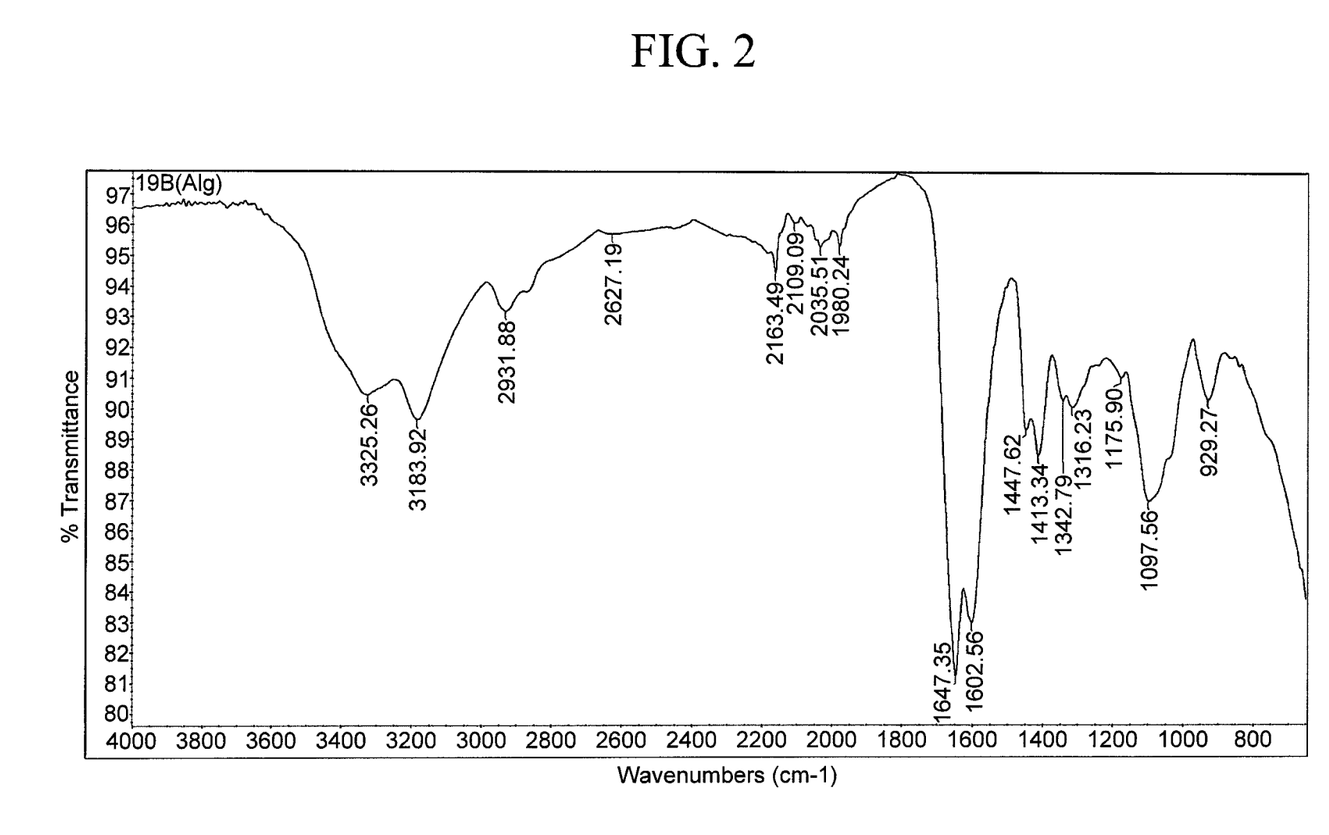
FIG. 2 is an infrared spectroscopy graph (IR) showing an IR spectrum of an interpenetrating polymer network (IPN) structure according to Preparation Example 1.

FIG. 2 is an infrared spectroscopy graph (IR) showing an IR spectrum of the interpenetrating polymer network (IPN) structure according to Preparation Example 1.

Referring to FIG. 2, peaks at 1602 cm$^{-1}$, 1447 cm$^{-1}$, and 1413 cm$^{-1}$ indicate a COO$^-$ functional group of sodium alginate, and a peak at 1097 cm$^{-1}$ indicates polyethylene glycol. In addition, peaks at 1647 cm$^{-1}$, 1342 cm$^{-1}$, and 1316 cm$^{-1}$ indicate polyacrylamide. Further, a little shift of an original NH$_2$ bending peak of the polyacrylamide from 1314 cm$^{-1}$ to the observed 1342 cm$^{-1}$ indicates a molecular interaction between sodium alginate and a polyacrylamide chain. Accordingly, it was confirmed that the binder according to Preparation Example 1 was formed as an interpenetrating polymer network (IPN) structure by a cyclic polymer and polyacrylamide (e.g., the IPN included a cyclic polymer and a polyacrylamide).

Evaluation 2: Phosphorus (P) Detection Analysis of Binder Composition

The binder composition according to Preparation Example 1 was examined using ion chromatograph (IC) analysis. The results are shown in FIG. 3.

Figure 3:
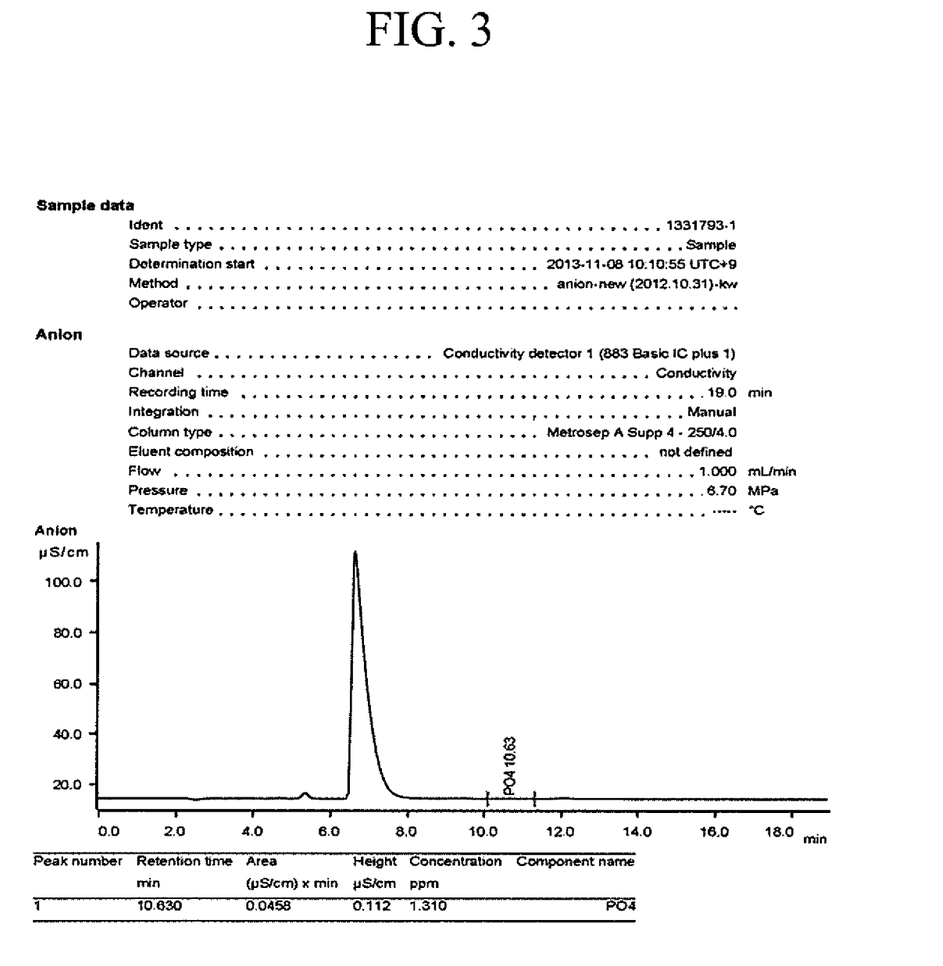
FIG. 3 is an ion chromatograph (IC) standard graph showing results for the binder composition according to Preparation Example 1.

FIG. 3 shows the ion chromatograph (IC) standard graph of the binder composition according to Preparation Example 1.

Referring to FIG. 3, since a phosphate anion (PO$_4^{3-}$) was found at around 10 minutes, it was confirmed that the binder composition according to Preparation Example 1 included the phosphate anion (PO$_4^{3-}$).

(Manufacture of Rechargeable Lithium Battery Cell)

EXAMPLES 1 TO 4 AND COMPARATIVE EXAMPLES 1 TO 5

Manufacture of Half-cell 58.5 wt % of a Si-based compound (a Si—Ti—Ni alloy, MK Electron Co., Ltd.), 22.05 wt % of first graphite (MC20, Mitsubishi Chemical Corp.), 9.45 wt % of second graphite (timrex SFG6, Timcal Ltd.), 2 wt % of ketjen black (KB603, LION) and 8 wt % of the binder composition shown in the following Table 1 were added to water, thereby preparing a slurry. In the foregoing, the wt % is based on the total weight of the solids content of the slurry. The slurry was coated on a copper foil current collector and then, dried and compressed, thereby manufacturing a negative electrode including the current collector and a negative active material layer (active mass) on the current collector. Here, the negative electrode had a loading level of 5.5 mg/cm$^2$ and an active mass density of 1.5 g/cc.

A 100 μm-thick lithium metal electrode was used as a counter electrode of the negative electrode.

An electrolyte solution was prepared by mixing ethylene carbonate (EC), diethyl carbonate (DEC) and fluoroethylene carbonate (FEC) at a volume ratio of 5:70:25, respectively, and adding 1.5 M LiPF$_6$ to the mixed solvent.

The negative electrode, the counter electrode, and the electrolyte solution were used to manufacture a half-cell.

(2) Manufacture of Full-cell

LiNi$_{0.6}$Co$_{0.2}$Mn$_{0.2}$O$_2$, ketjen black and polyvinylidene fluoride (PVdF) at a weight ratio of 94:3:3, respectively, were added to an N-methylpyrrolidone (NMP) solvent, thereby preparing a slurry. The slurry was coated on an aluminum (Al) foil and then, dried and compressed, thereby manufacturing a positive electrode.

The foregoing positive electrode, a polypropylene separator, and the negative electrode and the electrolyte solution used to manufacture the half-cell were used to manufacture a full-cell.

Evaluation 3: Adherence of Electrode Plate

Adherence of the negative electrodes according to Examples 1 to 4 and Comparative Examples 1 to 5 was evaluated by preparing a negative electrode sample having a size of 10 mm×25 mm, fixing it on a glass plate, holding it with a jig at the end, and pulling it to a distance 15 mm from the glass plate at a speed of 100 mm/min to peel it off. The results are shown in the following Table 1.

Evaluation 4: Initial Efficiency of Rechargeable Lithium Battery Cell

The half-cells according to Examples 1 to 4 and Comparative Examples 1 to 5 were charged and discharged at 0.1 C, their charge capacity and discharge capacity were measured to obtain initial efficiency, and the results are shown in the following Table 1. The initial efficiency (%) in the following Table 1 was calculated as a percentage of the discharge capacity relative to the charge capacity.

Evaluation 5: Cycle-life Characteristics of Rechargeable Lithium Battery Cell

The full cells according to Examples 1 to 4 and Comparative Examples 1 to 5 were subjected to 100 cycles of charging and discharging under a condition of 1 C, and their cycle-life characteristic results are shown in the following Table 1. In the following Table 1, the capacity retention (%) was calculated as a percentage of discharge capacity at the 100th cycle relative to discharge capacity at the first cycle.

TABLE 1

|  | Examples | | | | Comparative Examples | | | | |
| --- | --- | --- | --- | --- | --- | --- | --- | --- | --- |
|  | 1 | 2 | 3 | 4 | 1 | 2 | 3 | 4 | 5 |
| Binder composition | Preparation Example 1 | Preparation Example 2 | Preparation Example 3 | Preparation Example 4 | PAI | SA | PAA | PEG | Comparative Preparation Example 1 |
| Adherence of Electrode plate (gf/mm) | 4.1 | 3.5 | 3.9 | 3.7 | 3.5 | 2.6 | 2.1 | 0.1 | 2.8 |
| Initial efficiency (%) | 91 | 89 | 91 | 91 | 85 | 87 | 89 | 76 | 85 |

TABLE 1-continued

| | Examples | | | | Comparative Examples | | | | |
|---|---|---|---|---|---|---|---|---|---|
| | 1 | 2 | 3 | 4 | 1 | 2 | 3 | 4 | 5 |
| Capacity retention (%) | 86 | 78 | 83 | 81 | 76 | 66 | 60 | 10 | 63 |

The abbreviations in Table 1 are defined as follows:
PAI: polyamideimide (having a weight average molecular weight of 100,000 g/mol);
SA: sodium alginate (having a weight average molecular weight of 250,000 g/mol);
PAA: polyacrylamide (having a weight average molecular weight of 400,000 g/mol); and
PEG: polyethylene glycol (having a weight average molecular weight of 20,000 g/mol).

Referring to Table 1, Examples 1 to 4, which included the binder composition including the IPN structure of a cyclic polymer and polyacrylamide according to one embodiment, showed excellent initial efficiency and cycle-life characteristics as well as excellent adherence as compared with Comparative Examples 1 to 5, which did not include the binder composition including the IPN structure.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An electrode for a rechargeable lithium battery, the electrode comprising:
   an active material; and
   a binder composition for a rechargeable lithium battery, the binder composition comprising:
      an interpenetrating polymer network (IPN) structure comprising a cyclic polymer comprising a structural unit represented by Chemical Formula 1 or a structural unit represented by Chemical Formula 2, and polyacrylamide, Chemical Formula 1

Chemical Formula 2 wherein,
$R^1$, $R^2$, $R^{11}$, $R^{12}$, $R^{14}$ and $R^{15}$ are the same or different and are independently selected from hydrogen, a substituted or unsubstituted C1 to C5 alkyl group, or $-(CH_2)_p-COOX^1$, p being an integer of 1 to 5, and $X^1$ being an alkali metal,
$R^3$, $R^{13}$ and $R^{16}$ are the same or different and are independently $-OR^4$, $-NHR^5$ or $-COOX^2$, $X^2$ being an alkali metal, $R^4$ is hydrogen, a substituted or unsubstituted C1 to C5 alkyl group, or $-(CH_2)_p-COOX^1$, p being an integer of 1 to 5 and $X^1$ being an alkali metal, and $R^5$ is hydrogen or $-COCH_3$, and
n and m are integers of 5 to 20,000.

2. The electrode of claim 1, wherein the cyclic polymer comprises one of structural units represented by Chemical Formulae 3-1 to 3-6:

Chemical Formula 3-1

Chemical Formula 3-2

Chemical Formula 3-3

Chemical Formula 3-4

Chemical Formula 3-5

Chemical Formula 3-6 wherein,
$n^1$ to $n^5$ and $m^1$ are integers of 5 to 20,000.

3. The electrode of claim 1, wherein the cyclic polymer has a weight average molecular weight of about 2,000 to about 2,000,000 g/mol.

4. The electrode of claim 1, wherein the polyacrylamide has a weight average molecular weight of about 5,000 g/mol to about 1,000,000 g/mol.

5. The electrode of claim 1, wherein a mole ratio of the cyclic polymer to the polyacrylamide is about 1:9 to about 9:1.

6. The electrode of claim 1, wherein the binder composition further comprises an alkali metal ion added to the formed IPN structure.

7. The electrode of claim 6, wherein the alkali metal ion is included in the binder composition in an amount of 1 part by mole to 10 parts by mole based on 100 parts by mole of the interpenetrating polymer network (IPN) structure.

8. The electrode of claim 1, wherein the binder composition further comprises an alkali metal ion and a phosphorus (P)-based compound added to the formed IPN structure.

9. The electrode of claim 8, wherein the alkali metal ion and the phosphorus-based compound are adsorbed on the interpenetrating polymer network (IPN) structure.

10. The electrode of claim 8, wherein the phosphorus-based compound is included in the binder composition in an amount of about 1 part by mole to about 10 parts by mole based on 100 parts by mole of the interpenetrating polymer network (IPN) structure.

11. The electrode of claim 1, wherein the binder composition further comprises polyalkylene glycol comprising a structural unit represented by Chemical Formula 4, Chemical Formula 4 wherein,
i is an integer of 1 to 5, and
q is an integer of 1 to 500.

12. The electrode of claim 11, wherein the polyalkylene glycol is included in the binder composition in an amount of about 5 mol % to about 50 mol % based on the total moles of the binder composition.

13. The electrode of claim 11, wherein the polyalkylene glycol has a weight average molecular weight of about 400 g/mol to about 100,000 g/mol.

14. The electrode of claim 1, wherein the active material comprises Si, $SiO_x$, a Si—C composite, a Si-Q alloy, graphite, or a combination thereof, wherein $0<x<2$, and Q is an alkali metal, an alkaline-earth metal, Group 13 to 16 elements, a transition metal, a rare earth element, or a combination thereof with the proviso that Q is not Si.

15. A rechargeable lithium battery, comprising
a positive electrode;
a negative electrode; and
an electrolyte,
wherein at least one of the positive electrode and the negative electrode is the electrode of claim 1.

16. A method of preparing a binder composition for a rechargeable lithium battery, the method comprising:
preparing a cyclic polymer comprising a structural unit represented by Chemical Formula 1 or a structural unit represented by Chemical Formula 2;
adding an acrylamide monomer to a solution comprising the cyclic polymer to form an interpenetrating polymer network (IPN) structure of the cyclic polymer and a polyacrylamide formed from the acrylamide monomer, Chemical Formula 1

Chemical Formula 2 wherein,
$R^1$, $R^2$, $R^{11}$, $R^{12}$, $R^{14}$ and $R^{15}$ are the same or different and are independently selected from hydrogen, a substituted or unsubstituted C1 to C5 alkyl group, or —$(CH_2)_p$—$COOX^1$, p being an integer of 1 to 5, and $X^1$, being an alkali metal,
$R^3$, $R^{13}$ and $R^{16}$ are the same or different and are independently —$OR^4$, —$NHR^5$ or —$COOX^2$, $X^2$ being an alkali metal, $R^4$ is hydrogen, a substituted or unsubstituted C1 to C5 alkyl group, or —$(CH_2)_p$—$COOX^1$, p being an integer of 1 to 5, and $X^1$ being an alkali metal, and $R^5$ is hydrogen or —$COCH_3$, and
n and m are integers of 5 to 20,000; and
adding polyalkylene glycol comprising a structural unit represented by Chemical Formula 4 to a solution comprising the cyclic polymer before forming the interpenetrating polymer network (IPN) structure, Chemical Formula 4 wherein,
i is an integer of 1 to 5, and
q is an integer of 1 to 500.

17. The method of claim 16, further comprising adding an alkali metal compound to the formed interpenetrating polymer network (IPN) structure.

* * * * *